March 5, 1940.    W. M. THOMAS ET AL    2,192,529
PROJECTION APPARATUS
Filed May 10, 1938
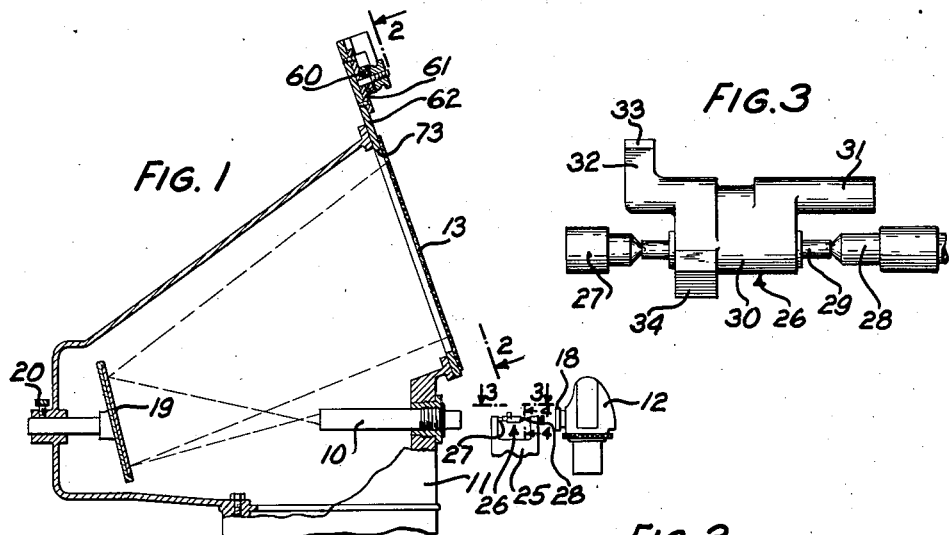
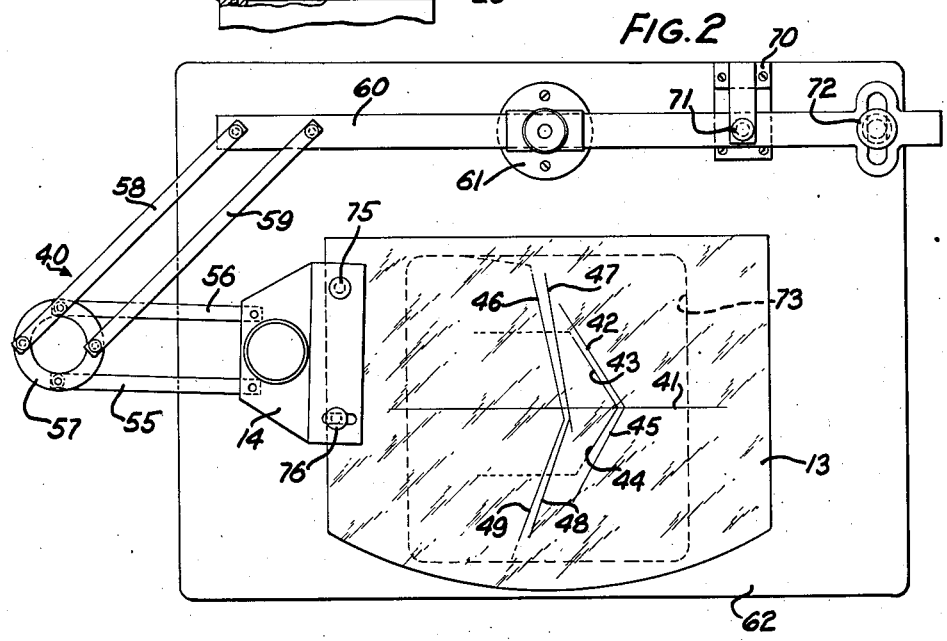
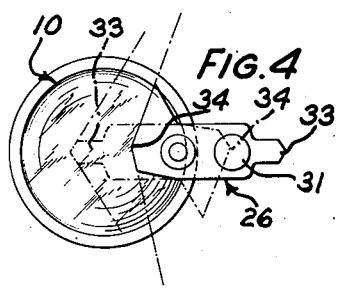
INVENTORS
W. M. THOMAS
A. W. SCHOOF
BY Emery Robinson
ATTORNEY Patented Mar. 5, 1940

2,192,529

UNITED STATES PATENT OFFICE 2,192,529

PROJECTION APPARATUS

Walter M. Thomas, Chicago, and Arthur W. Schoof, Riverside, Ill., assignors to Western Electric Company, Incorporated, New York, N. Y., a corporation of New York Application May 10, 1938, Serial No. 207,014

4 Claims. (Cl. 88—24)

This invention relates to projection apparatus and more particularly to optical projectors for gauging the angular relationship of surfaces on small parts.

It is an object of the present invention to provide a projecting apparatus for rapidly and economically inspecting small parts.

In accordance with one embodiment of the invention, as applied to a projector for gauging small parts having a number of angularly disposed surfaces, such as the escapement pawls used in automatic telephone dialing apparatus, an optical projector is provided, the translucent screen of which may be moved horizontally or vertically without disturbing the basic level thereof; that is, although the chart is moved either horizontally or vertically, it will maintain a base line thereon parallel to a predetermined plane regardless of the horizontal or vertical position to which it is moved. In the preferred embodiment of the invention, the translucent chart of the projector is mounted upon the base of the machine by means of a pantograph arrangement.

A better understanding of the details of the invention will be had by reference to the following specification, when considered in conjunction with the accompanying drawing, wherein:

Fig. 1 is a diagrammatic sectional view of a projector embodying the features of the invention;

Fig. 2 is an enlarged elevational view of the means for mounting the translucent screen, taken substantially along the line 2—2 of Fig. 1 in the direction of the arrows;

Fig. 3 is an enlarged fragmentary plan view, taken along the line 3—3 of Fig. 1 in the direction of the arrows, showing a pawl mounted in the projector for inspection; and Fig. 4 is a fragmentary sectional view, taken along the line 4—4 of Fig. 1 in the direction of the arrows, showing the pawl in two of its adjusted positions, one position being shown in solid lines and the other position being shown in dot and dash lines.

Referring to the drawing, wherein like reference characters designate the same parts throughout the several views, a projector of substantially the same type as that shown in the patent to Beardsley et al., No. 2,035,780, patented March 31, 1936, is shown in section (Fig. 1) wherein a lens system 10 is mounted in a hollow casing 11 and is adapted to receive light beams projected from a light source 12 past an object mounted between the light source 12 and the lens system 10 to cast a sharp shadow image of the object on a chart or translucent screen 13 suitably inscribed and mounted in a chart holder 14. The light from the light source 12 is directed through a condensing lens 18, which is in alignment with the lens system 10, and the light rays passing through the lens system 10 will be directed upon a reflecting mirror 19 mounted within the casing 11. This mirror is adjustably mounted by means of a set screw 20 and reflects the rays of light from the lens system 10 and directs them to the chart or screen 13.

Adjustably mounted between the condensing lens 18 and lens system 10 is an adjustable bracket 25, which may be moved to support an article 26 in position between the lens 18 and the lens system 10. The bracket 25 has a pair of article supporting members 27 and 28 for supporting the article 26 in either of two adjusted positions in the path of the light from the condensing lens 18. The part chosen for illustration, and which is of the type that lends itself to inspection by apparatus such as that disclosed herein, is an impulsing pawl or escapement pawl designed for use in an automatic telephone transmitter. This particular part has a supporting shaft 29 extending through an enlarged body portion 30 and a contact actuating arm 31 extending from the body portion 30. Formed integrally with the enlarged body portion 30 is a ratchet engaging extension 32, having a triangular shaped end 33, the angular faces of which must be maintained in a predetermined angular relationship with the angular faces of a spring engaging projection 34, also formed integrally with the body portion 30. In the manufacture of pawls for telephone dials, the angularity of the surfaces of the end 33 and projection 34 is highly critical and somewhat difficult to measure or compare with a standard due to the fact that the apexes of the angles formed by the surfaces 33 and 34 are not in a plane parallel to any surface of the body portion 30, nor do they coincide with a line drawn through the center of the supporting shaft 29. The inspection of these parts is therefore difficult.

In order to inspect the angularity of triangular-shaped end 33, the part is positioned in the bracket 25 with the part in the position shown in dot and dash lines in Fig. 4. The shadow of the part will then be reflected from the mirror 19 onto the translucent screen 13. The screen 13, after the part has been positioned in the bracket, may be adjusted to the desired position by the pantograph arrangement, designated generally by the numeral 40, to bring the reference line 41 inscribed on the screen into alignment with the apex of the end 33. If the end 33 has its surfaces between the reference lines 42 and 43 and 44 and 45 inscribed on the screen, then the end portion has the proper angularity and the part may be rotated through 180 degrees to cast the shadow of the projection 34 on the screen. If the shadow of the edges of the projection 34 falls within the reference lines 46 and 47 and 48 and 49, the part is accepted.

The pantograph arrangement 40 comprises a pair of levers 55 and 56 pivoted to the chart holder 14 at their right ends (Fig. 2) and pivoted on an annular member 57 which has pivoted to it a pair of levers 58 and 59. The ends of the levers 58 and 59 away from the annular member 57 are pivoted on a main support bar 60, which is in turn mounted in a swivel 61 supported by a plate 62, mounted upon the upper end of the casing 11. The plate 62 has mounted thereon a bracket 70 having a stop pin 71 threaded in it for normally holding the main support bar in position parallel with the upper edge of the plate 62. The main support bar may, if it is desired, be held in position other than the normal position by the clamp nut 72 upon loosening the stop pin 71. The plate 62, which is mounted upon the upper end of the casing 11, has an aperture 73 therein, which is adapted to be covered by the screen 13. However, as will be apparent, the screen may be adjusted horizontally or vertically by means of the pantograph arrangement without changing the degree of parallelism of the reference line 41 with the plate 62 by adjusting the pantograph arrangement. However, if it is desired to shift the screen slightly with respect to the pantograph arrangement, means is provided, consisting of a pivot pin 75 and a thumb screw 76, whereby the screen may be adjusted with respect to the pantograph.

Although a specific embodiment of the invention has been described hereinbefore, it will be understood that it is subject to many modifications and is to be limited in scope only by the appended claims.

What is claimed is:

1. In a projection apparatus, a chart for receiving an image of an article, said chart having lines inscribed thereon for reference with the shadow of the article, means for casting a shadow image of an article on said chart, means for supporting the chart in said apparatus, including an adjustable main support bar, means for securing said support bar in any of its positions after it is adjusted, and a pantograph arrangement of levers interconnecting the support bar and the chart for movably supporting the chart in a plurality of horizontally and vertically spaced positions parallel to a given reference plane.

2. In a projection apparatus, a chart for receiving an image of an article, said chart having lines marked thereon for reference with the shadow of the article, means for supporting the chart in said apparatus including an adjustable main support bar, means for securing said support bar in various angular positions, a pantograph arrangement of levers interconnecting the support bar and the chart for movably supporting the chart in a plurality of positions parallel to a given reference plane, and means for casting an image of the article upon said chart.

3. In a projection apparatus, a chart for receiving an image of an article, said chart having lines marked thereon for reference with the shadow of the article, means for supporting the chart in said apparatus including an adjustable main support bar, means for securing said support bar in various angular positions, a pantograph arrangement of levers interconnecting the support bar and the chart for movably supporting the chart in a plurality of positions parallel to a given reference plane, and means for casting an image of said article on said chart including means for positioning the article in either of a plurality of adjusted positions.

4. A projection apparatus comprising a translucent chart having lines thereon for reference with the shadow of an article, a chart holder for supporting said chart, a pair of levers parallel one to the other and of equal length pivoted to said holder, an intermediate member pivotally connected to both of said levers, a second pair of levers parallel one to the other and of equal length pivoted on the intermediate member, the pivot points of the first pair of levers on the intermediate member being in a plane at right angles to the plane in which lie the pivot points of the second pair of levers on the intermediate member, an angularly adjustable main support bar on which the second pair of levers are pivoted, means for directing a beam of light on said chart, and means for supporting an article in the beam of light whereby an enlarged shadow of the article will be thrown on the chart.

WALTER M. THOMAS.
ARTHUR W. SCHOOF.